United States Patent
Okada

(10) Patent No.: US 9,500,078 B2
(45) Date of Patent: Nov. 22, 2016

(54) SEGMENT ROUNDNESS MEASURING DEVICE AND SEGMENT ROUNDNESS MEASURING METHOD

(71) Applicant: HITACHI ZOSEN CORPORATION, Osaka-shi, Osaka (JP)

(72) Inventor: Toshiyuki Okada, Osaka (JP)

(73) Assignee: HITACHI ZOSEN CORPORATION, Osaka-shi (JP)

( * ) Notice: Subject to any disclaimer, the term of this patent is extended or adjusted under 35 U.S.C. 154(b) by 0 days.

(21) Appl. No.: 14/649,699

(22) PCT Filed: Nov. 12, 2013

(86) PCT No.: PCT/JP2013/080529
§ 371 (c)(1),
(2) Date: Jun. 4, 2015

(87) PCT Pub. No.: WO2014/109122
PCT Pub. Date: Jul. 17, 2014

(65) Prior Publication Data
US 2015/0308268 A1    Oct. 29, 2015

(30) Foreign Application Priority Data

Jan. 9, 2013   (JP) ................. 2013-002106

(51) Int. Cl.
| | |
|---|---|
| *E21D 11/40* | (2006.01) |
| *E21D 9/06* | (2006.01) |
| *G01B 21/20* | (2006.01) |
| *G01B 21/22* | (2006.01) |
| *G01B 11/24* | (2006.01) |

(52) U.S. Cl.
CPC ................ *E21D 11/40* (2013.01); *E21D 9/06* (2013.01); *G01B 11/2408* (2013.01); *G01B 21/20* (2013.01); *G01B 21/22* (2013.01)

(58) Field of Classification Search
CPC ..... E21D 11/40; E21D 9/06; G01B 11/2408; G01B 21/22; G01B 21/20
See application file for complete search history.

(56) References Cited

U.S. PATENT DOCUMENTS

| | | | | |
|---|---|---|---|---|
| 6,886,264 | B2 * | 5/2005 | Sakata ................ | G01B 7/282 33/502 |
| 2002/0066197 | A1 * | 6/2002 | Sano ................... | B24B 1/00 33/549 |

(Continued)

FOREIGN PATENT DOCUMENTS

| | | |
|---|---|---|
| JP | 62-72900 A | 4/1987 |
| JP | 1-263515 A | 10/1989 |
| JP | 6-9118 Y2 | 3/1994 |

OTHER PUBLICATIONS

Machine translation of Japanese Patent Publication No. 01-263515, Oct. 20, 1989.*

(Continued)

*Primary Examiner* — Mary Cheung
(74) *Attorney, Agent, or Firm* — Westerman, Hattori, Daniels & Adrian, LLP

(57) ABSTRACT

A segment roundness measuring device including a correction means that corrects the positional deviation of the turning center of an erector turning portion resulting from eccentricity on the basis of an angle detected by an angle detector and distances measured by three or more distance meters arranged at angular positions different from each other in the erector turning portion.

8 Claims, 8 Drawing Sheets

(56) References Cited

U.S. PATENT DOCUMENTS

2004/0075829 A1* 4/2004 Doytchinov ............ G01B 5/201
356/243.1
2008/0224549 A1* 9/2008 Kokubun ............. H02K 15/024
310/254.1
2008/0294369 A1* 11/2008 Kojima ................ G01B 21/045
702/168

OTHER PUBLICATIONS

Written Opinion dated Oct. 29, 2015, issued in counterpart Singapore Patent Application No. 11201504979X. (6 pages).

* cited by examiner

FIG.8

DISTANCES FROM TURNING CENTER TO INNER SURFACE
OF SEGMENT RING AND AVERAGE DISTANCES

| TURNING ANGLE($\theta$) | FIRST DISTANCE METER | SECOND DISTANCE METER | THIRD DISTANCE METER | FOURTH DISTANCE METER | AVERAGE DISTANCES |
|---|---|---|---|---|---|
| 0 DEGREES | | | | | Ra(0) |
| 1 DEGREE | | | | | Ra(1) |
| 2 DEGREES | | | | | Ra(2) |
| ⋮ | | | | | ⋮ |
| 45 DEGREES | Lr1(45) | | | | Ra(45) |
| ⋮ | | | | | ⋮ |
| 135 DEGREES | | Lr2(135) | | | Ra(135) |
| ⋮ | | | | | ⋮ |
| 225 DEGREES | | | Lr3(225) | | Ra(225) |
| ⋮ | | | | | ⋮ |
| 315 DEGREES | | | | Lr4(315) | Ra(315) |
| ⋮ | | | | | ⋮ |
| 359 DEGREES | | | | | Ra(359) |

SEGMENT ROUNDNESS MEASURING DEVICE AND SEGMENT ROUNDNESS MEASURING METHOD

TECHNICAL FIELD

The present invention relates to a segment roundness measuring device and a segment roundness measuring method.

BACKGROUND ART

In general, a shield tunneling method for continuously constructing a circular tunnel by boring the tunnel by a shield tunneling machine and assembling segments in a ring shape inside the shield tunneling machine is known as a method for constructing a tunnel. When the shield tunneling machine assembles the segments in the ring shape in the tunnel while excavating in this shield tunneling method, it is necessary to grasp the assembly error (roundness) or the shape of an existing segment and modify the assembly of a subsequent segment. Thus, in general, various methods have been proposed as a method for grasping the shape or the roundness of the existing segment, as disclosed in Japanese Patent No. 2820011, for example.

In Japanese Patent No. 2820011, there is disclosed an existing segment shape grasping method for grasping the shape of an existing segment (segment ring) by measuring distances to the inner peripheral surface of the segment by a plurality of sensors provided in an erector device. Specifically, in this existing segment shape grasping method, the coordinates of a plurality of positions on the inner peripheral surface of the segment are obtained on the basis of the distances to the inner peripheral surface of the segment measured by the plurality of sensors and the turning angles of the sensors, and the shape of the existing segment (segment ring) is grasped by approximating the shape of the existing segment by an ellipse on the basis of eccentricity between the center of the segment and the turning centers of the sensors (the turning center of the erector device).

PRIOR ART

Patent Document

Patent Document 1: Japanese Patent No. 2820011

SUMMARY OF THE INVENTION

Problem to be Solved by the Invention

In the conventional erector device described in Japanese Patent No. 2820011, however, a device that grasps and assembles segments is arranged, and hence the center of gravity of the erector device is not necessarily at the turning center, and the turning center of the erector device may be often eccentric (the turning axis may be often deviated). In this case, if the existing segment shape grasping method according to Japanese Patent No. 2820011 is employed, distance measurement values measured by the sensors provided in the erector device include errors caused by the eccentricity of the turning center of the erector device. Thus, it is conceivably difficult to accurately grasp the shape of the existing segment (segment ring) even if an operation for grasping the shape of the existing segment is carried out on the basis of the distance measurement values including the errors. Therefore, there may be such a problem that it is difficult to accurately acquire the roundness of the existing segment (segment ring) also when the roundness of the segment is acquired on the basis of the shape of the existing segment grasped according to Japanese Patent No. 2820011.

The present invention has been proposed in order to solve the aforementioned problem, and an object of the present invention is to provide a segment roundness measuring device and a segment roundness measuring method each capable of accurately acquiring the roundness of a segment ring even when the turning center of an erector turning portion is eccentric.

Means for Solving the Problem

In order to attain the aforementioned object, a segment roundness measuring device according to a first aspect of the present invention includes an angle detector that detects the turning angle of an erector turning portion, the turning center of which is eccentric, three or more distance meters that are arranged at angular positions different from each other in the erector turning portion and measure distances to the inner surface of a segment ring obtained by assembling segments in a ring shape and correction means that corrects the positional deviation of the turning center of the erector turning portion resulting from eccentricity on the basis of the angle detected by the angle detector and the distances measured by the three or more distance meters.

As hereinabove described, the segment roundness measuring device according to the first aspect of the present invention is provided with the correction means that corrects the positional deviation of the turning center of the erector turning portion resulting from eccentricity on the basis of the angle detected by the angle detector and the distances measured by the three or more distance meters arranged at the angular positions different from each other in the erector turning portion, whereby the correction means can correct the positional deviation of the turning center of the erector turning portion resulting from eccentricity and reduce the influence of errors of distance measurement values caused by the eccentricity of the turning center even when the turning center of the erector turning portion is eccentric, and hence the roundness of the segment ring can be accurately acquired on the basis of the distance measurement values. Furthermore, the distance meters are arranged in the erector turning portion, whereby the erector turning portion can also be used for distance measurement of the segment ring, and hence no turning portion dedicated for measurement, the turning center of which is not eccentric may be provided separately from the erector turning portion, the turning center of which is eccentric. Thus, no space dedicated for arrangement of the turning portion dedicated for measurement may be ensured separately in a shield tunneling machine where there are many spatial limitations.

In the aforementioned segment roundness measuring device according to the first aspect, the three or more distance meters are preferably circumferentially arranged at the angular positions different from each other in the erector turning portion so as to be at equal angular intervals or be line-symmetric. According to this structure, the three or more distance meters can be circumferentially arranged in a balanced manner with respect to the turning center of the erector turning portion, and hence the correction means can more accurately correct the positional deviation of the turning center of the erector turning portion resulting from eccentricity on the basis of the angle detected by the angle detector and the distances measured by the three or more distance meters circumferentially arranged in a balanced manner. Consequently, the roundness of the segment ring can be more accurately acquired.

In the aforementioned segment roundness measuring device according to the first aspect, the correction means is preferably configured to correct the positional deviation of the turning center of the erector turning portion resulting from eccentricity by carrying out averaging on the basis of distance measurement values measured by the three or more distance meters at the same turning angle of the erector turning portion. According to this structure, the correction means can easily correct the positional deviation of the turning center resulting from eccentricity at the same turning angle (prescribed turning angle) of the erector turning portion simply by carrying out averaging based on the distance measurement values without carrying out a complicated operation, and hence the roundness of the segment ring can be easily accurately acquired.

In this case, the correction means is preferably configured to correct the positional deviation of the turning center of the erector turning portion resulting from eccentricity by calculating an average distance by obtaining and averaging distances from the turning center to the inner surface of the segment ring associated with the distance meters by adding mounting distances from the turning center of the erector turning portion to the mounting positions of the distance meters that are previously acquired to the distance measurement values measured by the three or more distance meters. According to this structure, the correction means corrects the positional deviation of the turning center of the erector turning portion resulting from eccentricity simply by calculating the average distance at the same turning angle (prescribed turning angle) of the erector turning portion, and hence the correction means can easily accurately obtain the distance values from the turning center of the erector turning portion to the inner surface of the segment ring at the prescribed turning angle. Consequently, the roundness of the segment ring can be more accurately acquired.

In the aforementioned structure in which the correction means calculates the average distance, the correction means is preferably configured to correct the positional deviation of the turning center of the erector turning portion resulting from eccentricity at every prescribed turning angle of the erector turning portion by calculating the average distance at every prescribed turning angle, and further acquire the roundness of the segment ring by converting a plurality of average distances calculated at every prescribed turning angle to a plurality of X-Y coordinate values and correcting the center position of the segment ring on the basis of the plurality of X-Y coordinate values. According to this structure, the correction means corrects the positional deviation of the turning center resulting from eccentricity at every prescribed turning angle of the erector turning portion, and hence the distances from the turning center of the erector turning portion to the inner surface of the segment ring can be accurately obtained at every prescribed turning angle, and the roundness of the segment ring can be accurately acquired. Furthermore, the correction means converts the plurality of average distances obtained by calculation at every prescribed turning angle to the X-Y coordinate values and corrects the center position of the segment ring, whereby the roundness of the segment ring can be easily evaluated in a state where the center position of the segment ring is corrected.

A segment roundness measuring method according to a second aspect of the present invention includes steps of detecting the turning angle of an erector turning portion, the turning center of which is eccentric and measuring distances to the inner surface of a segment ring at the same turning angle as the turning angle that has been detected by three or more distance meters arranged at angular positions different from each other in the erector turning portion and correcting the positional deviation of the turning center of the erector turning portion resulting from eccentricity by carrying out averaging on the basis of distance measurement values measured by the three or more distance meters at the same turning angle of the erector turning portion.

As hereinabove described, the segment roundness measuring method according to the second aspect of the present invention is provided with the step of correcting the positional deviation of the turning center of the erector turning portion resulting from eccentricity by carrying out averaging on the basis of the distance measurement values measured by the three or more distance meters at the same turning angle of the erector turning portion, whereby the positional deviation of the turning center resulting from eccentricity can be corrected while the influence of errors of the distance measurement values caused by the eccentricity of the turning center can be reduced even when the turning center of the erector turning portion is eccentric, and hence the roundness of the segment ring can be accurately acquired on the basis of the distance measurement values. Furthermore, the distance meters are arranged in the erector turning portion, whereby the erector turning portion can also be used for distance measurement of the segment ring, and hence no turning portion dedicated for measurement, the turning center of which is not eccentric may be provided separately from the erector turning portion, the turning center of which is eccentric. Thus, no space dedicated for arrangement of the turning portion dedicated for measurement may be ensured separately in a shield tunneling machine where there are many spatial limitations. In addition, the step of correcting the positional deviation of the turning center of the erector turning portion resulting from eccentricity by carrying out averaging on the basis of the distance measurement values measured by the three or more distance meters at the same turning angle of the erector turning portion is provided, whereby the positional deviation of the turning center resulting from eccentricity at the same turning angle (prescribed turning angle) of the erector turning portion can be easily corrected simply by carrying out averaging based on the distance measurement values without carrying out a complicated operation, and hence the roundness of the segment ring can be easily accurately acquired.

In the aforementioned segment roundness measuring method according to the second aspect, the step of correcting the positional deviation of the turning center of the erector turning portion resulting from eccentricity preferably includes a step of calculating an average distance by obtaining and averaging distances from the turning center to the inner surface of the segment ring associated with the distance meters by adding mounting distances from the turning center of the erector turning portion to the mounting positions of the distance meters that are previously acquired to the distance measurement values measured by the three or more distance meters, and correcting the positional deviation of the turning center of the erector turning portion resulting from eccentricity at every prescribed turning angle of the erector turning portion by calculating the average distance at every prescribed turning angle, and the segment roundness measuring method preferably further includes a step of acquiring the roundness of the segment ring by converting a plurality of average distances calculated at every prescribed turning angle to a plurality of X-Y coordinate values and correcting the center position of the segment ring on the basis of the plurality of X-Y coordinate values. According to this structure, the positional deviation of the turning center of the erector turning portion resulting from eccentricity is corrected simply by calculating the average distance at the same turning angle (prescribed turning angle) of the erector turning portion, and hence the distance values from the turning center of the erector turning portion to the inner surface of the segment ring at the prescribed turning angle can be easily accurately obtained. Furthermore, the positional deviation of the turning center resulting from eccentricity is corrected at every prescribed turning angle of the erector turning portion, and hence the distance values from the turning center of the erector turning portion to the inner surface of the segment ring can be accurately obtained at every prescribed turning angle, and the roundness of the segment ring can be accurately acquired. In addition, the correction means converts the plurality of average distances obtained by calculation at every prescribed turning angle to the X-Y coordinate values and corrects the center position of the segment ring, whereby the roundness of the segment ring can be easily evaluated in a state where the center position of the segment ring is corrected.

Effect of the Invention

According to the present invention, as hereinabove described, the roundness of the segment ring can be accurately acquired even when the turning center of the erector turning portion is eccentric.

BRIEF DESCRIPTION OF THE DRAWINGS

FIG. 8 A diagram for illustrating distances from the turning center of the erector device to the inner surface of a segment ring and their average distances in the segment roundness measuring device according to the embodiment of the present invention.

MODES FOR CARRYING OUT THE INVENTION

An embodiment of the present invention is hereinafter described on the basis of the drawings.

The structure of a segment roundness measuring device 100 according to the embodiment of the present invention is now described with reference to FIGS. 1 to 3.

Figure 1:
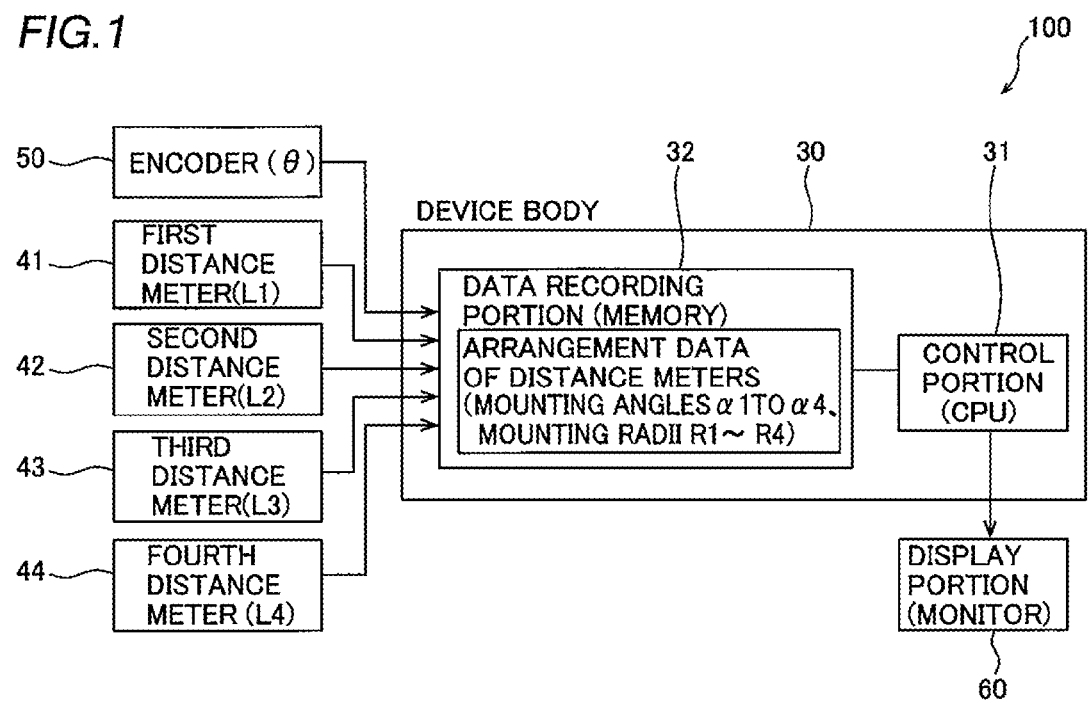
FIG. 1 A block diagram showing the overall structure of a segment roundness measuring device according to an embodiment of the present invention.
Figure 2:
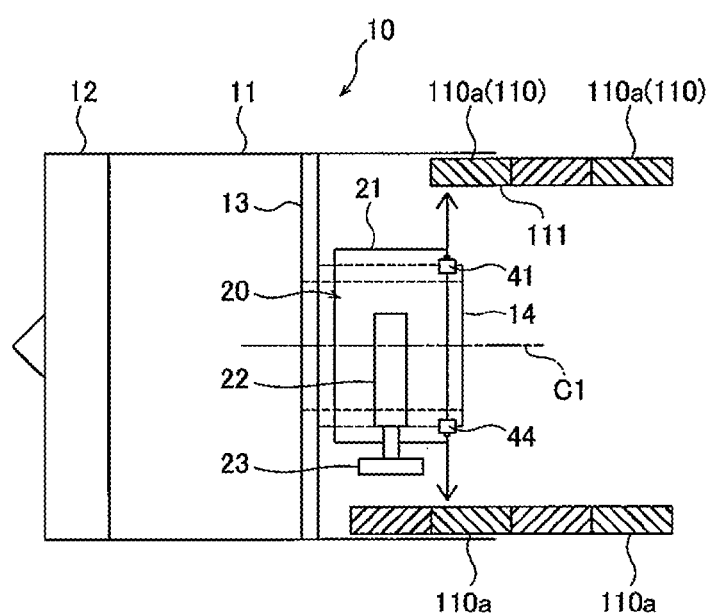
FIG. 2 A schematic diagram showing a shield tunneling machine in which the segment roundness measuring device according to the embodiment of the present invention is applied.

As shown in FIG. 2, the segment roundness measuring device 100 (see FIG. 1) is a device that acquires an assembly error (roundness) of a segment ring (existing segment) 110 when a shield tunneling machine 10 assembles segments 110a in a ring shape in a tunnel while excavating. The shield tunneling machine 10 is a shield tunneling machine 10 having a large diameter (at least 10 m in diameter) and corresponds to a closed type shield tunneling method. Specifically, the shield tunneling machine 10 includes a cylindrical shield frame 11 and a cutter head 12 arranged on the front end of the shield frame 11 in an excavation direction, as shown in FIG. 2. The shield tunneling machine 10 is configured to excavate while assembling the segments 110a divided into a plurality of (according to this embodiment, eight) pieces in the ring shape (segment ring 110) by an erector device 20 arranged on the rear side in the machine.

Figure 3:
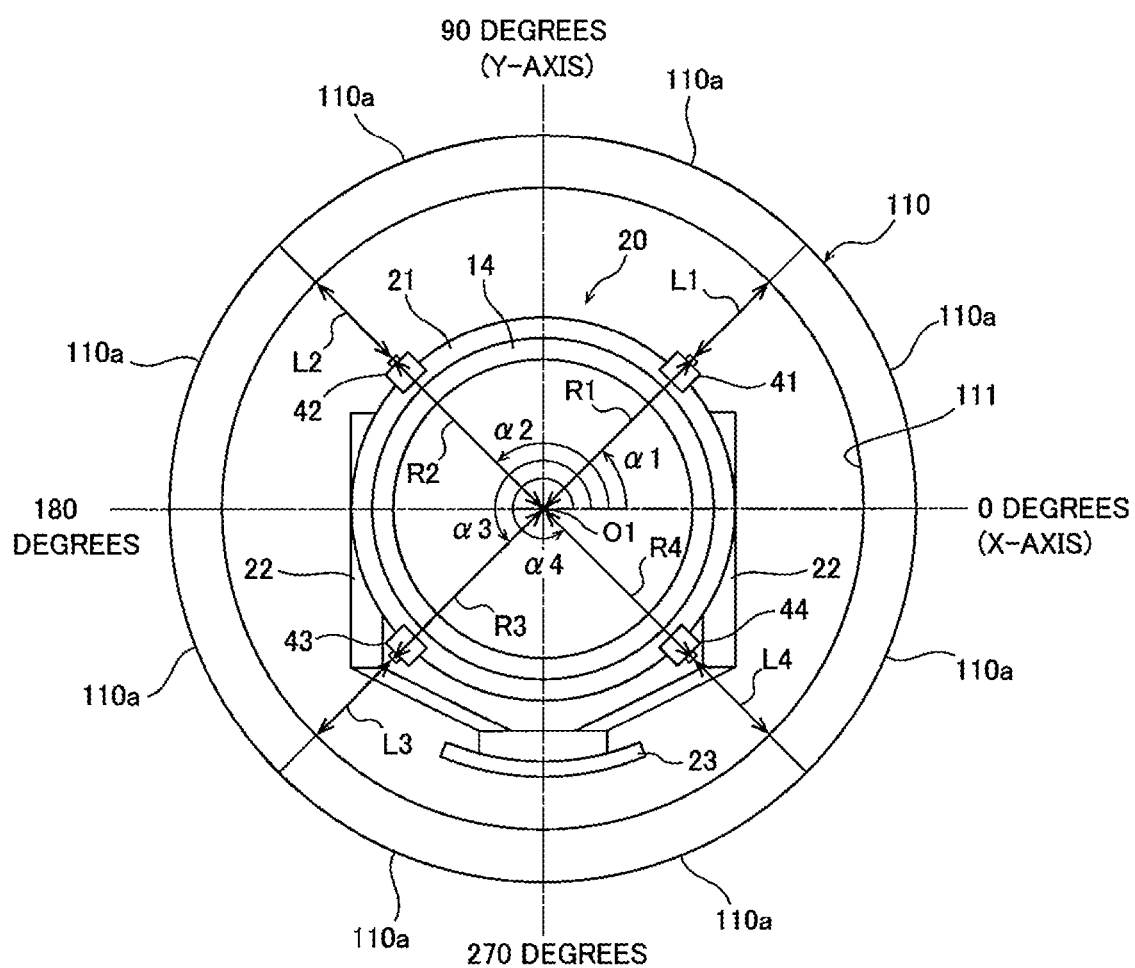
FIG. 3 A diagram showing the arrangement of four distance meters of the segment roundness measuring device according to the embodiment of the present invention.

The erector device 20 includes a cylindrical body portion 21, a pair of arm portions 22 mounted on the body portion 21, and a grasping portion 23 that is mounted on tip ends of the pair of arm portions 22 and grasps the segments 110a, as shown in FIGS. 2 and 3. Inside the shield tunneling machine 10, a supporting girder 13 fixed to the shield tunneling machine 10 and a cylindrical shaft portion 14 that is supported by the supporting girder 13 and extends in the excavation direction of the tunnel are provided, as shown in FIG. 2. In the erector device 20, the cylindrical body portion 21 is fitted to the outer periphery of the cylindrical shaft portion 14 through a ring-shaped bearing (not shown) and is turnably (rotatably) supported by the shaft portion 14. In other words, as shown in FIG. 3, the cylindrical body portion 21, the pair of arm portions 22, and the grasping portion 23 are configured to integrally rotate about a turning center O1 on the central axis C1 (see FIG. 2) of the body portion 21, as viewed in the axial direction of the body portion 21. The shaft portion 14 is provided with a rotary drive motor (not shown) that rotates the erector device 20. Furthermore, in the internal space of the cylindrical shaft portion 14 that supports the erector device 20, an unshown screw conveyer or the like that continuously discharges excavated soil is arranged. The body portion 21 is an example of the "erector turning portion" in the present invention.

According to this embodiment, the segment roundness measuring device 100 includes a device body 30, four distance meters 41 to 44, an encoder 50 that is mounted on the unshown rotary drive motor and detects the turning angle of the erector device 20, and a display portion (monitor) 60 connected to the device body 30, as shown in FIG. 1. The device body 30 is a sequencer (PLC (programmable logic controller)), for example, and includes a control portion (CPU) 31 and a data recording portion (memory) 32. The data recording portion 32 stores arrangement data of the four distance meters 41 to 44. The arrangement data of the four distance meters 41 to 44 includes data of the mounting angles $\alpha 1$ to $\alpha 4$ of the four distance meters 41 to 44 described later and data of the distances (mounting radii) R1 to R4 (see FIG. 3) of the four distance meters 41 to 44 from the turning center O1. The control portion 31 is an example of the "correction means" in the present invention, and the encoder 50 is an example of the "angle detector" in the present invention.

The four distance meters 41 to 44 are laser distance meters that measure a distance to a targeted object in a non-contact manner by emitting a laser beam. The four distance meters 41 to 44 are mounted on the outer peripheral portion of the body portion 21 of the erector device 20. Specifically, a first distance meter 41, a second distance meter 42, a third distance meter 43, and a fourth distance meter 44 are arranged at positions corresponding to $\alpha 1$ degrees (according to this embodiment, 45 degrees), $\alpha 2$ degrees (according to this embodiment, 135 degrees), $\alpha 3$ degrees (according to this embodiment, 225 degrees), and $\alpha 4$ degrees (according to this embodiment, 315 degrees), respectively, in a counterclockwise direction with respect to a horizontal direction corresponding to an X-axis in a state where the grasping portion 23 is located on a lower end position (a state at a basic position), as shown in FIG. 3. In other words, the four distance meters 41 to 44 are circumferentially arranged at angular positions different from each other so as to be at equal angular intervals (90 degree intervals). The first distance meter 41, the second distance meter 42, the third distance meter 43, and the fourth distance meter 44 are arranged at positions separated by the distances (mounting radii) R1, R2, R3, and R4, respectively, in a radiation direction from the turning center O1 of the erector device 20. The aforementioned mounting angles $\alpha 1$ to $\alpha 4$ and mounting radii R1 to R4 are previously measured and are previously recorded in the data recording portion 32, as described above.

The four distance meters 41 to 44 are configured to measure distances to the inner surface 111 of the segment ring 110 obtained by assembling the segments 110a in the ring shape. More specifically, the four distance meters 41 to 44 are configured to measure distances to the inner surface 111 of the segment ring 110 in the radiation direction of the body portion 21. After assembling the segment ring 110, the erector device 20 rotates by 360 degrees (rotates one revolution) about the turning center O1, whereby the four distance meters 41 to 44 measure the distances to the inner surface 111 at every prescribed turning angle (according to this embodiment, 1 degree). In other words, the number of measure points of each of the distance meters 41 to 44 according to this embodiment is 360. Due to this structure, the four distance meters 41 to 44 measure the distances to the inner surface 111 at the angular positions where the turning angles ($\theta$) are offset from each other by 90 degrees at the same timing when the erector device 20 rotates by 360 degrees (rotates one revolution). The four distance meters 41 to 44 and the encoder 50 are connected to the device body 30, and distance measurement value data (L1 to L4) measured (acquired) by the four distance meters 41 to 44 and turning angle data ($\theta$) detected (acquired) by the encoder 50 are transmitted to the data recording portion 32 of the device body 30 and are sequentially stored in the data recording portion 32.

According to this embodiment, the control portion 31 is configured to correct the positional deviation of the turning center O1 of the erector device 20 (body portion 21) resulting from eccentricity on the basis of the turning angle ($\theta$) detected by the encoder 50 and the distance measurement values (L1 to L4) measured by the four distance meters 41 to 44. In the erector device 20 according to this embodiment, the turning center O1 is made eccentric by the weights of the pair of arm portions 22 and the grasping portion 23. In other words, the inventor has found from the results of various studies that since the erector device 20 is generally provided with the pair of arm portions 22, the grasping portion 23, etc. that grasp and assemble the segments 110a, the center of gravity of the erector device 20 is not necessarily at the turning center and the turning center O1 of the erector device 20 is often eccentric. By focusing on this point, the inventor obtained a finding that roundness can be acquired with a high degree of accuracy by correcting the positional deviation of the turning center O1 of the erector device 20 resulting from eccentricity.

Roundness acquisition processing executed by the control portion 31 of the segment roundness measuring device 100 according to this embodiment is now described in detail with reference to FIGS. 4 to 10.

Figure 4:
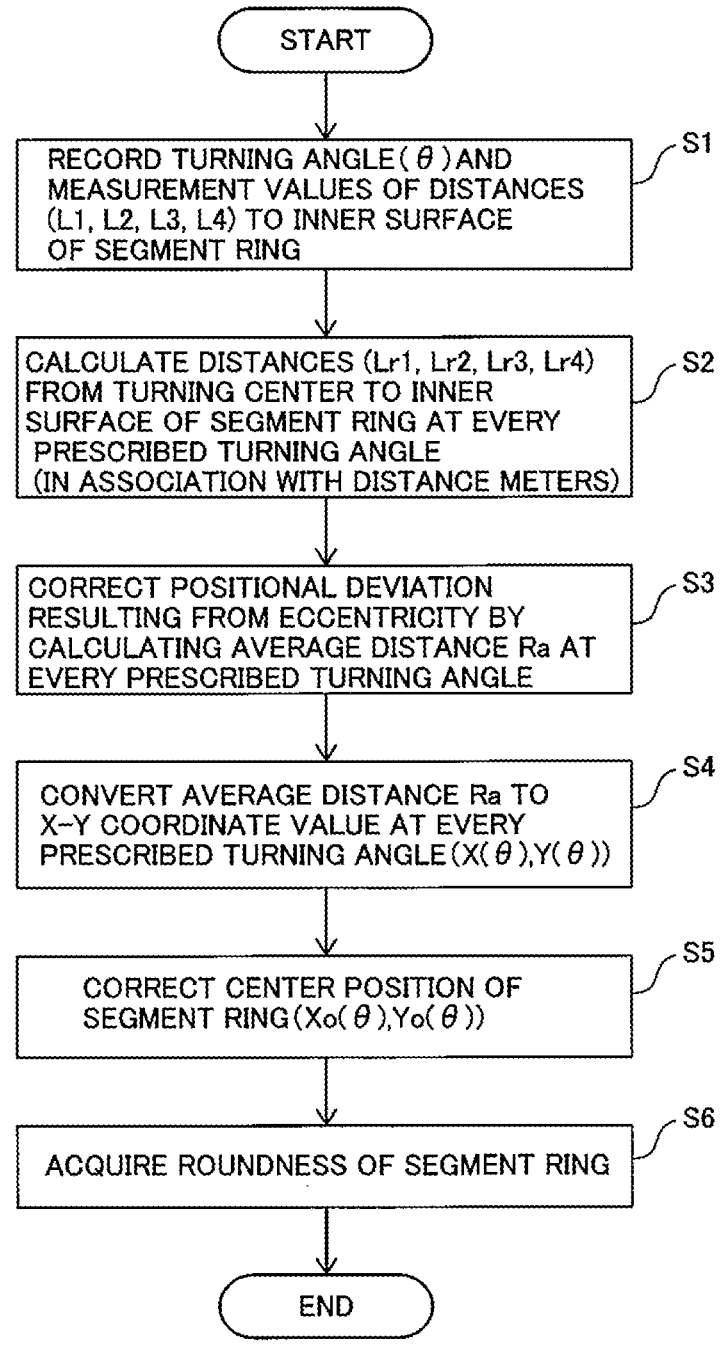
FIG. 4 A flowchart showing roundness acquisition processing in the segment roundness measuring device according to the embodiment of the present invention.

After the erector device 20 assembles the segments 110a in the ring shape to form the segment ring 110, the control portion 31 performs control of recording the turning angle data ($\theta$) detected by the encoder 50 at every prescribed turning angle (according to this embodiment, 1 degree) and the measurement value data of the distances (L1 to L4) to the inner surface 111 of the segment ring 110 measured by the four distance meters 41 to 44 in the data recording portion 32 at a step S1 in FIG. 4 when the erector device 20 rotates by 360 degrees (rotates one revolution) about the turning center O1. In other words, a plurality of pieces of turning angle data ($\theta$) detected by the encoder 50 and the distance measurement value data (L1 to L4) measured by the four distance meters 41 to 44 at those turning angles ($\theta$) are associated with each other and are stored in the data recording portion 32.

Figure 5:
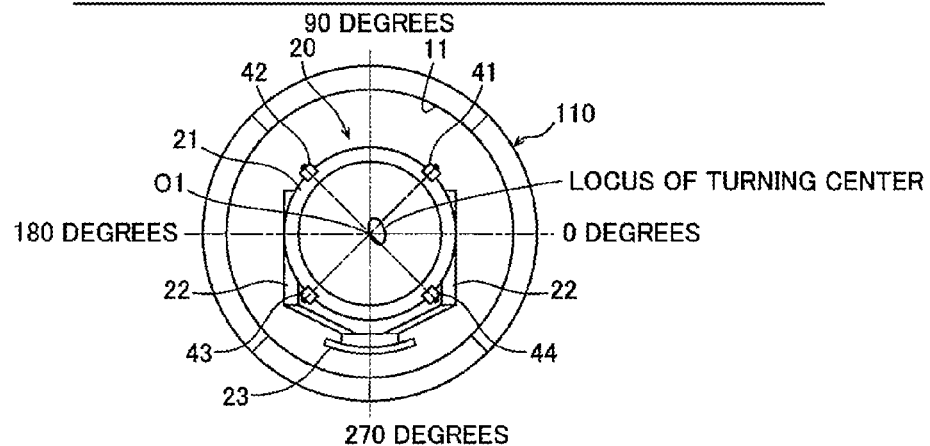
FIG. 5 A schematic diagram showing a state where an erector device is at a basic position (a turning angle of 0 degrees) in the segment roundness measuring device according to the embodiment of the present invention.
Figure 6:
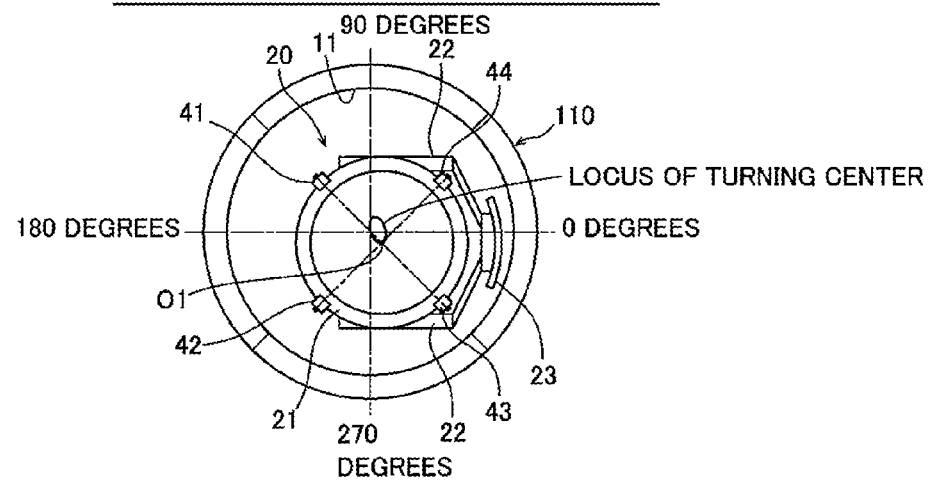
FIG. 6 A schematic diagram showing a state where the turning angle of the erector device is 90 degrees in the segment roundness measuring device according to the embodiment of the present invention.
Figure 7:
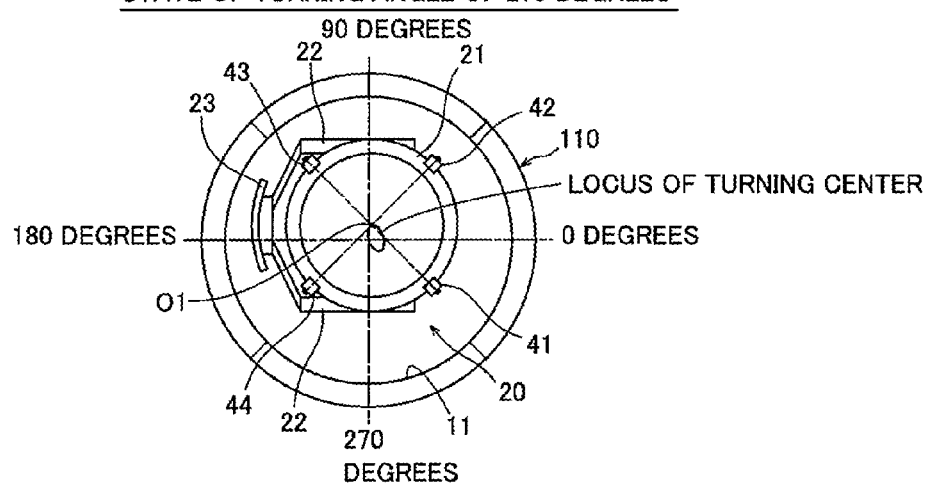
FIG. 7 A schematic diagram showing a state where the turning angle of the erector device is 270 degrees in the segment roundness measuring device according to the embodiment of the present invention.

According to this embodiment, the turning center O1 of the erector device 20 is eccentric, and hence the turning center O1 of the erector device 20 conceivably positionally deviates (axial runout) with respect to the segment ring 110, as shown in FIGS. 5 to 7 when the erector device 20 turns. This positional deviation is conceivably periodic and reproducible with respect to the turning angles ($\theta$). In other words, the turning center O1 of the erector device 20 conceivably positionally deviates so as to draw a prescribed locus (along a prescribed locus). Thus, the distances measured by the four distance meters 41 to 44 at the same turning angle are measured in a state where the turning center O1 is positionally different.

Then, the control portion 31 calculates the distances (Lr1 to Lr4) from the turning center O1 of the erector device 20 to the inner surface 111 of the segment ring 110 according to the following expressions (1) to (4) at every prescribed turning angle (according to this embodiment, 1 degree) at a step S2. The distances (Lr1 to Lr4) from the turning center O1 to the inner surface 111 of the segment ring 110 are calculated in association with the four distance meters 41 to 44, respectively, as shown in FIG. 8. The distance Lr1 associated with the first distance meter 41 is calculated at every prescribed turning angle (according to this embodiment, 1 degree) from a position where the turning angle is 45 degrees (a position corresponding to the mounting angle α1) following an increase of the turning angle (θ) of the erector device 20 by the prescribed turning angle (according to this embodiment, 1 degree). Similarly to the aforementioned first distance meter 41, the distances Lr2, Lr3, and Lr4 associated with the second distance meter 42, the third distance meter 43, and the fourth distance meter 44 are calculated at every prescribed turning angle (according to this embodiment, 1 degree) from a position where the turning angle is 135 degrees (a position corresponding to the mounting angle α2), a position where the turning angle is 225 degrees (a position corresponding to the mounting angle α3), and a position where the turning angle is 315 degrees (a position corresponding to the mounting angle α4), respectively.

$$Lr1(\theta+\alpha1)=L1(\theta+\alpha1)+R1 \qquad (1)$$

$$Lr2(\theta+\alpha2)=L2(\theta+\alpha2)+R2 \qquad (2)$$

$$Lr3(\theta+\alpha3)=L3(\theta+\alpha3)+R3 \qquad (3)$$

$$Lr4(\theta+\alpha4)=L4(\theta+\alpha4)+R4 \qquad (4)$$

In the aforementioned expression (1), Lr1 represents the distance from the turning center O1 to the inner surface 111 of the segment ring 110 at the prescribed turning angle associated with the first distance meter 41, θ represents the turning angle of the erector device 20, α1 represents the mounting angle of the first distance meter 41, L1 represents the measurement value of the distance to the inner surface 111 of the segment ring 110 measured by the first distance meter 41, and R1 represents the distance (mounting radius) of the first distance meter 41 from the turning center O1. Similarly to the aforementioned expression (1) associated with the first distance meter 41, the aforementioned expressions (2), (3), and (4) correspond to the second distance meter 42, the third distance meter 43, and the fourth distance meter 44, respectively. The mounting angles α1 to α4 and the mounting radii R1 to R4 are retrieved from the data recording portion 32 that previously stores the same, and the calculations according to the aforementioned expressions (1) to (4) are performed.

Then, the control portion 31 corrects the positional deviation of the turning center O1 resulting from eccentricity by calculating average distances Ra of the four distances Lr1, Lr2, Lr3, and Lr4 associated with the four distance meters 41 to 44, respectively, at the same turning angles (θ) of the erector device 20, as shown in FIG. 8, according to the following expression (5) at a step S3. More specifically, the four distances Lr1, Lr2, Lr3, and Lr4 are averaged at every prescribed turning angle (according to this embodiment, 1 degree), whereby variations in the four distances Lr1, Lr2, Lr3, and Lr4 (the positional deviation of the turning center O1 resulting from eccentricity) at each turning angle are corrected. In other words, the control portion 31 calculates an average distance Ra at every prescribed turning angle to correct the positional deviation of the turning center O1 resulting from eccentricity at every prescribed turning angle.

$$Ra(\theta)=\{Lr1(\theta)+Lr2(\theta)+Lr3(\theta)+Lr4(\theta)\}/4 \qquad (5)$$

In the aforementioned following expression (5), Ra represents the average distance at the prescribed turning angle, Lr1 represents the distance from the turning center O1 to the inner surface 111 of the segment ring 110 at the prescribed turning angle associated with the first distance meter 41, Lr2 represents the distance from the turning center O1 to the inner surface 111 of the segment ring 110 at the prescribed turning angle associated with the second distance meter 42, Lr3 represents the distance from the turning center O1 to the inner surface 111 of the segment ring 110 at the prescribed turning angle associated with the third distance meter 43, and Lr4 represents the distance from the turning center O1 to the inner surface 111 of the segment ring 110 at the prescribed turning angle associated with the fourth distance meter 44.

The control portion 31 converts a plurality of (according to this embodiment, 360) average distances Ra calculated at every prescribed turning angle (according to this embodiment, 1 degree) to a plurality of (according to this embodiment, 360) X-Y coordinate values according to the following expressions (6) and (7) at a step S4.

$$X(\theta)=Ra(\theta)\times\cos(\theta) \qquad (6)$$

$$Y(\theta)=Ra(\theta)\times\sin(\theta) \qquad (7)$$

In the aforementioned expressions (6) and (7), X represents an X-coordinate value at the prescribed turning angle, Y represents a Y-coordinate value at the prescribed turning angle, and Ra represents the average distance at the prescribed turning angle.

Figure 9:
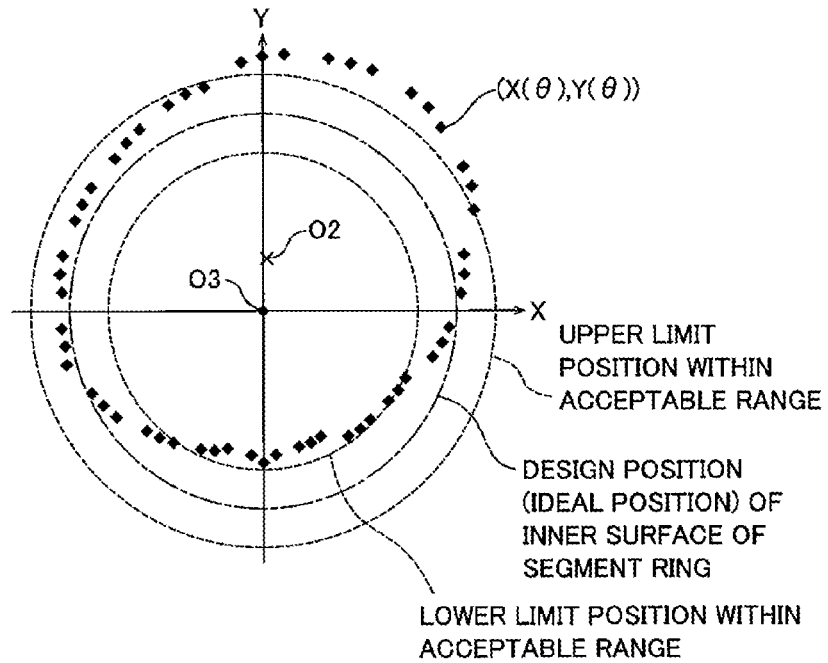
FIG. 9 A diagram showing a state before correction of the center position of the segment ring in the segment roundness measuring device according to the embodiment of the present invention.
Figure 10:
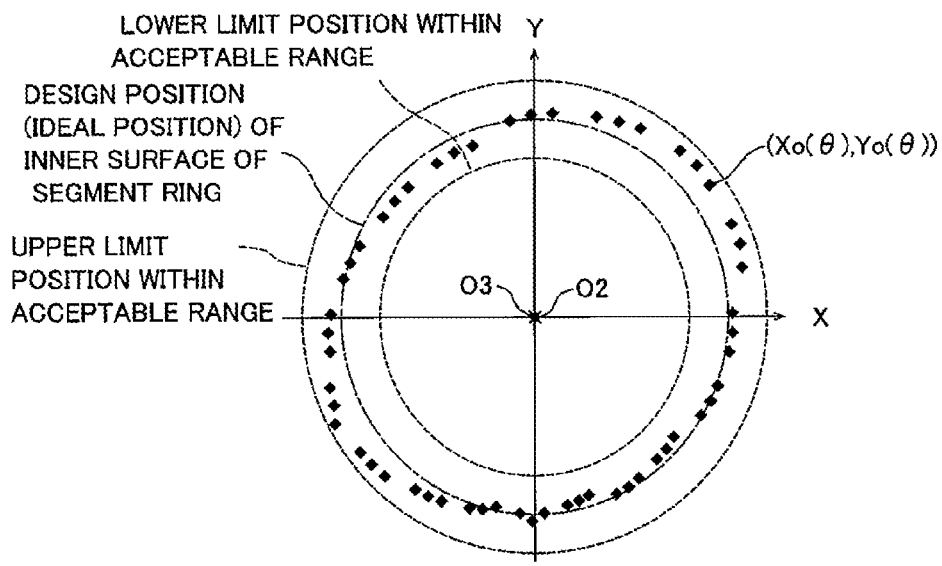
FIG. 10 A diagram showing a state after the correction of the center position of the segment ring in the segment roundness measuring device according to the embodiment of the present invention.

The control portion 31 corrects the position of the center O2 of the segment ring 110 at the X-Y coordinate values according to the following expressions (8) and (9) on the basis of the plurality of X-Y coordinate values for every prescribed turning angle (according to this embodiment, 1 degree) at a step S5. Specifically, as shown in FIGS. 9 and 10, the control portion 31 offsets and corrects the position of the center O2 to the position of the design center O3 of the segment ring 110 by subtracting the position of the center of gravity (average value) of the plurality of X-Y coordinate values (X(θ), Y(θ)) acquired at every prescribed turning angle from the X-Y coordinate values (X(θ), Y(θ)).

$$Xo(\theta)=X(\theta)-\Sigma X(\theta)/N \qquad (8)$$

$$Yo(\theta)=Y(\theta)-\Sigma Y(\theta)/N \qquad (9)$$

In the aforementioned expressions (8) and (9), Xo represents the corrected X-coordinate value at the prescribed turning angle, Yo represents the corrected Y-coordinate value at the prescribed turning angle, x represents the uncorrected X-coordinate value at the prescribed turning angle, Y represents the uncorrected Y-coordinate value at the prescribed turning angle, and N represents the number of (according to this embodiment, 360) measure points.

The control portion 31 acquires the roundness of the segment ring 110 at a step S6 by correcting the position of the center O2 of the plurality of measurement values (X-Y coordinate values) of the segment ring 110, as described above. Specifically, the control portion 31 performs control of displaying the calculated corrected X-Y coordinate values (Xo, Yo) as a plot on the display portion 60 to acquire the degree of the positional deviation (roundness) of the corrected X-Y coordinate values (Xo(θ), Yo(θ)) with respect to the design position of the inner surface 111 of the segment ring 110. An operator can determine whether or not the corrected X-Y coordinate values (Xo(θ), Yo(θ)) plotted as shown in FIG. 10 are located within the acceptable range (within the range between the upper limit position and the lower limit position) of the inner surface 111 of the segment ring 110 and easily evaluate the roundness.

According to this embodiment, as hereinabove described, the control portion 31 that corrects the positional deviation of the turning center O1 of the erector device 20 (body portion 21) resulting from eccentricity on the basis of the angle detected by the encoder 50 and the distances measured by the four distance meters 41 to 44 arranged at the angular positions different from each other in the body portion 21 of the erector device 20 is provided. Thus, the control portion 31 can correct the positional deviation of the turning center O1 of the erector device 20 resulting from eccentricity and reduce the influence of errors of the distance measurement values L1, L2, L3, and L4 caused by the eccentricity of the turning center O1 even when the turning center O1 of the erector device 20 is eccentric, and hence the roundness of the segment ring 110 can be accurately acquired on the basis of the distance measurement values. Furthermore, the distance meters 41 to 44 are arranged in the body portion 21 of the erector device 20, whereby the body portion 21 of the erector device 20 can also be used for distance measurement of the segment ring 110, and hence no turning portion dedicated for measurement, the turning center O1 of which is not eccentric may be provided separately from the erector device 20, the turning center O1 of which is eccentric. Thus, no space dedicated for arrangement of the turning portion dedicated for measurement may be ensured separately in the shield tunneling machine 10 where there are many spatial limitations.

According to this embodiment, as hereinabove described, the four distance meters 41 to 44 are circumferentially arranged at the different angular positions in the body portion 21 of the erector device 20 so as to be at the equal angular intervals (90 degree intervals). Thus, the four distance meters 41 to 44 can be circumferentially arranged in a balanced manner with respect to the turning center O1 of the erector device 20, and hence the control portion 31 can more accurately correct the positional deviation of the turning center O1 of the body portion 21 of the erector device 20 resulting from eccentricity on the basis of the angle detected by the encoder 50 and the distances measured by the four distance meters 41 to 44 circumferentially arranged in a balanced manner. Consequently, the roundness of the segment ring 110 can be more accurately acquired.

According to this embodiment, as hereinabove described, the control portion 31 corrects the positional deviation of the turning center O1 of the erector device 20 resulting from eccentricity by carrying out averaging on the basis of the distance measurement values L1, L2, L3, and L4 measured by the four distance meters 41 to 44 at the same turning angle of the erector device 20. Thus, the control portion 31 can easily correct the positional deviation of the turning center O1 resulting from eccentricity at the same turning angle (prescribed turning angle) of the erector device 20 simply by carrying out averaging based on the distance measurement values without carrying out a complicated operation, and hence the roundness of the segment ring 110 can be easily accurately acquired.

According to this embodiment, as hereinabove described, the control portion 31 calculates the average distance Ra by obtaining and averaging the distances Lr1, Lr2, Lr3, and Lr4 from the turning center O1 to the inner surface 111 of the segment ring 110 associated with the four distance meters 41 to 44 by adding the mounting distances R1, R2, R3, and R4 from the turning center O1 of the erector device 20 to the mounting positions of the distance meters 41 to 44 previously acquired to the distance measurement values L1, L2, L3, and L4 measured by the four distance meters 41 to 44, respectively, so as to correct the positional deviation of the turning center O1 of the erector device 20 resulting from eccentricity. Thus, the control portion 31 corrects the positional deviation of the turning center O1 of the erector device 20 resulting from eccentricity simply by calculating the average distance at the same turning angle (prescribed turning angle) of the erector device 20, and hence the control portion 31 can easily accurately obtain the distance values from the turning center O1 of the erector device 20 to the inner surface 111 of the segment ring 110 at the prescribed turning angle. Consequently, the roundness of the segment ring 110 can be more accurately acquired.

According to this embodiment, as hereinabove described, the control portion 31 corrects the positional deviation of the turning center O1 of the erector device 20 resulting from eccentricity at every prescribed turning angle by calculating the average distance Ra at every prescribed turning angle (according to this embodiment, 1 degree) of the erector device 20, and further acquires the roundness of the segment ring 110 by converting the plurality of average distances obtained by calculation at every prescribed turning angle to the plurality of X-Y coordinate values (X, Y) and correcting the position of the center O2 of the segment ring 110 on the basis of the plurality of X-Y coordinate values. Thus, the control portion 31 corrects the positional deviation of the turning center O1 resulting from eccentricity at every prescribed turning angle of the erector device 20, and hence the distances from the turning center O1 of the erector device 20 to the inner surface 111 of the segment ring 110 can be accurately obtained at every prescribed turning angle, and the roundness of the segment ring 110 can be accurately acquired. Furthermore, the control portion 31 converts the plurality of average distances obtained by calculation at every prescribed turning angle to the X-Y coordinate values and corrects the position of the center O2 of the segment ring 110, whereby the roundness of the segment ring 110 can be easily evaluated in a state where the position of the center O2 of the segment ring 110 is corrected.

The embodiment disclosed this time must be considered as illustrative in all points and not restrictive. The range of the present invention is shown not by the above description of the embodiment but by the scope of claims for patent, and all modifications within the meaning and range equivalent to the scope of claims for patent are further included.

For example, while the example of applying the segment roundness measuring device and the segment roundness measuring method according to the present invention to the shield tunneling method employing the shield tunneling machine has been shown in the aforementioned embodiment, the present invention is not restricted to this. The segment roundness measuring device and the segment roundness measuring method according to the present invention may be applied to a method other than the shield tunneling method, such as a TBM (tunnel boring machine) method, so far as the same is a method for assembling the segments and constructing the segment ring.

While the laser distance meters have been shown as an example of the distance meter according to the present invention in the aforementioned embodiment, the present invention is not restricted to this. According to the present invention, distance meters other than the laser distance meters, such as ultrasonic distance meters that ultrasonically measure a distance in a non-contact manner or non-contact distance meters, may be employed.

While the example of circumferentially arranging the four distance meters at the different angular positions at the equal angular intervals has been shown in the aforementioned embodiment, the present invention is not restricted to this.

Figure 11:
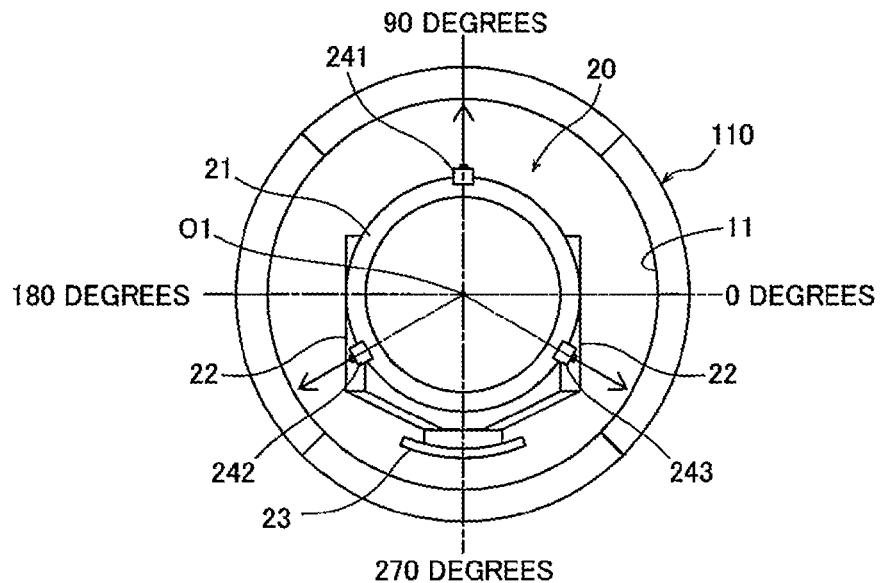
FIG. 11 A diagram showing a first modification in which there are three distance meters in the segment roundness measuring device according to the embodiment of the present invention.
Figure 12:
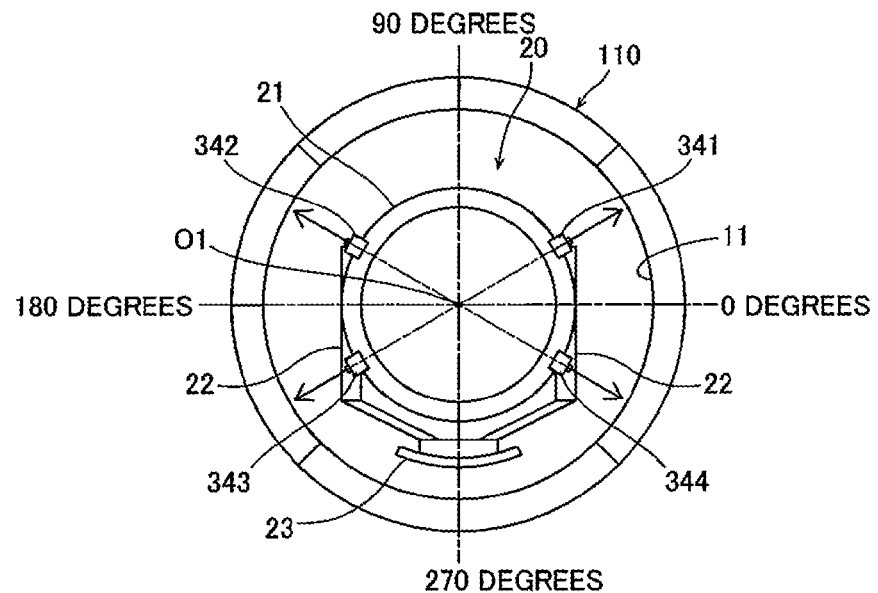
FIG. 12 A diagram showing a second modification in which a plurality of distance meters are line-symmetrically arranged in the segment roundness measuring device according to the embodiment of the present invention.

According to the present invention, as in a first modification shown in FIG. 11, three distance meters (241, 242, and 243) may be circumferentially arranged at different angular positions at equal angular intervals (120 degree intervals), or five or more distance meters may be circumferentially arranged at different angular positions. Alternatively, as in a second modification shown in FIG. 12, a plurality of distance meters (341, 342, 343, and 344) may be circumferentially arranged at different angular positions so as to be line-symmetric with respect to straight lines (a horizontal line and a vertical line in FIG. 12) that pass through the turning center O1 of an erector device 20.

Figure 13:
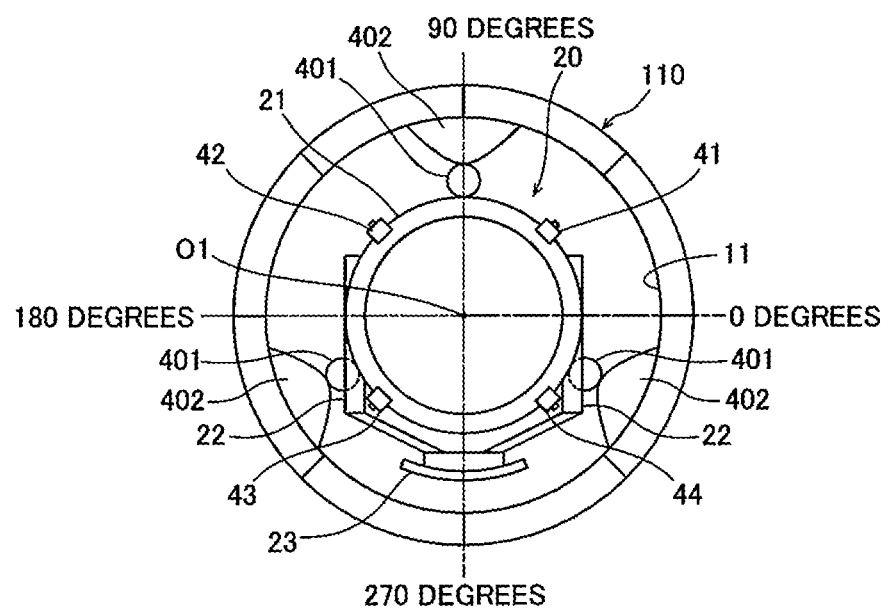
FIG. 13 A diagram showing a third modification in which an erector device is supported from the outside of a body portion in the segment roundness measuring device according to the embodiment of the present invention.

While the example of turnably (rotatably) supporting the erector device by the shaft portion fixed in the shield tunneling machine has been shown in the aforementioned embodiment, the present invention is not restricted to this. According to the present invention, as in a third modification shown in FIG. 13, an erector device may be turnably (rotatably) supported from the outside of a body portion 21 through rollers 401 by a plurality of supporting portions 402 fixed in a shield tunneling machine.

While the example of mounting the plurality of distance meters on the cylindrical body portion of the erector device that turns (rotates) has been shown in the aforementioned embodiment, the present invention is not restricted to this. According to the present invention, the plurality of distance meters may be mounted on the erector turning portion except the body portion, such as the arm portions or the grasping portion, so far as the same is a portion (erector turning portion) of the erector device that turns.

While the example of correcting the positional deviation of the turning center resulting from eccentricity by obtaining the distances (Lr1 to Lr4) from the turning center to the inner surface of the segment ring associated with the distance meters and averaging the same has been shown in the aforementioned embodiment, the present invention is not restricted to this. According to the present invention, the positional deviation of the turning center resulting from eccentricity may be corrected by averaging the distance measurement values (L1 to L4) measured by the distance meters, so far as the distances (R1 to R4) from the turning center to the distance meters are equal to each other.

While the example of offsetting and correcting the position of the center O2 to the position of the design center O3 of the segment ring by subtracting the position of the center of gravity (average value) of the plurality of X-Y coordinate values $(X(\theta), Y(\theta))$ acquired at every prescribed turning angle from the X-Y coordinate values $(X(\theta), Y(\theta))$ has been shown in the aforementioned embodiment, the present invention is not restricted to this. According to the present invention, the position of the center O2 may be offset and corrected to the position of the design center O3 of the segment ring by subtracting a value intermediate between the maximum value and the minimum value of the plurality of X-Y coordinate values $(X(\theta), Y(\theta))$ from the X-Y coordinate values $(X(\theta), Y(\theta))$ according to the following expressions (10) and (11).

$$Xo(\theta)=X(\theta)-\{X(\theta)_{max}+X(\theta)_{min}\}/2 \quad (10)$$

$$Yo(\theta)=Y(\theta)-\{Y(\theta)_{max}+Y(\theta)_{min}\}/2 \quad (11)$$

In the aforementioned expressions (10) and (11), Xo represents the corrected X-coordinate value at the prescribed turning angle, Yo represents the corrected Y-coordinate value at the prescribed turning angle, X represents the uncorrected X-coordinate value at the prescribed turning angle, Y represents the uncorrected Y-coordinate value at the prescribed turning angle, $X_{max}$ represents the maximum value of a plurality of uncorrected X-coordinate values, $X_{min}$ represents the minimum value of the plurality of uncorrected X-coordinate values, $Y_{max}$ represents the maximum value of a plurality of uncorrected Y-coordinate values, and $Y_{min}$ represents the minimum value of the plurality of uncorrected Y-coordinate values.

While the example of measuring the distances to the inner surface of the segment ring at every one degree by the distance meters when the erector device rotates by 360 degrees (rotates one revolution) has been shown in the aforementioned embodiment, the present invention is not restricted to this. According to the present invention, the distances to the inner surface of the segment ring may be measured at every prescribed turning angle other than one degree by the distance meters. If there are a large number of measure points, the number of plotting points is increased, and hence the shape (position) of the inner surface of the segment ring can be more accurately grasped. Thus, the roundness of the segment ring can be easily evaluated. Alternatively, the erector device may rotate a plurality of times (rotate by 360 degrees or more) during measurement, and the distances to the inner surface of the segment ring at the same turning angle may be measured a plurality of times by the common distance meters. In this case, a plurality of distance measurement values at the same turning angle measured a plurality of times by the common distance meters may be averaged and used.

While the example of correcting the positional deviation of the turning center of the erector device resulting from eccentricity by the control portion (correction means) of the device body including the sequencer has been shown in the aforementioned embodiment, the present invention is not restricted to this. According to the present invention, a PC (personal computer) including a control portion (CPU) may be provided, and this control portion of the PC may be employed as the correction means according to the present invention that corrects the positional deviation of the turning center of the erector device resulting from eccentricity. Alternatively, a sequencer (or a PC) including a data recording portion and a sequencer (or a PC) including a control portion (CPU) may be provided separately from each other, and these sequencers may cooperate so as to be employed as the correction means according to the present invention that corrects the positional deviation of the turning center of the erector device resulting from eccentricity.

REFERENCE NUMERALS

10: shield tunneling machine
20: erector device
21: body portion (erector turning portion)
31: control portion (correction means)
41: first distance meter (distance meter)
42: second distance meter (distance meter)
43: third distance meter (distance meter)
44: fourth distance meter (distance meter)
50: encoder (angle detector)
100: segment roundness measuring device
110: segment ring
110a: segment
111: inner surface of segment ring
241, 242, 243, 341, 342, 343, 344: distance meter
O1: turning center

The invention claimed is:

1. A segment roundness measuring device comprising:
an angle detector that detects a turning angle of an erector turning portion, a turning center of which is eccentric;
three or more distance meters that are arranged at angular positions different from each other in the erector turning portion and measure distances to an inner surface of a segment ring obtained by assembling segments in a ring shape; and
correction means that corrects a positional deviation of the turning center of the erector turning portion resulting from eccentricity on the basis of the angle detected by the angle detector and the distances measured by the three or more distance meters.

2. The segment roundness measuring device according to claim 1, wherein
the three or more distance meters are circumferentially arranged at the angular positions different from each other in the erector turning portion so as to be at equal angular intervals or be line-symmetric.

3. The segment roundness measuring device according to claim 2, wherein
the correction means is configured to correct the positional deviation of the turning center of the erector turning portion resulting from eccentricity by carrying out averaging on the basis of distance measurement values measured by the three or more distance meters at the same turning angle of the erector turning portion.

4. The segment roundness measuring device according to claim 1, wherein
the correction means is configured to correct the positional deviation of the turning center of the erector turning portion resulting from eccentricity by carrying out averaging on the basis of distance measurement values measured by the three or more distance meters at the same turning angle of the erector turning portion.

5. The segment roundness measuring device according to claim 4, wherein
the correction means is configured to correct the positional deviation of the turning center of the erector turning portion resulting from eccentricity by calculating an average distance by obtaining and averaging distances from the turning center to the inner surface of the segment ring associated with the distance meters by adding mounting distances from the turning center of the erector turning portion to mounting positions of the distance meters that are previously acquired to the distance measurement values measured by the three or more distance meters.

6. The segment roundness measuring device according to claim 5, wherein
the correction means is configured to correct the positional deviation of the turning center of the erector turning portion resulting from eccentricity at every prescribed turning angle of the erector turning portion by calculating the average distance at every prescribed turning angle, and further acquire roundness of the segment ring by converting a plurality of the average distances calculated at every prescribed turning angle to a plurality of X-Y coordinate values and correcting a center position of the segment ring on the basis of the plurality of X-Y coordinate values.

7. A segment roundness measuring method comprising steps of:
detecting a turning angle of an erector turning portion, a turning center of which is eccentric and measuring distances to an inner surface of a segment ring at the same turning angle as the turning angle that has been detected by three or more distance meters arranged at angular positions different from each other in the erector turning portion; and
correcting a positional deviation of the turning center of the erector turning portion resulting from eccentricity by carrying out averaging on the basis of distance measurement values measured by the three or more distance meters at the same turning angle of the erector turning portion.

8. The segment roundness measuring method according to claim 7, wherein
the step of correcting the positional deviation of the turning center of the erector turning portion resulting from eccentricity includes a step of calculating an average distance by obtaining and averaging distances from the turning center to the inner surface of the segment ring associated with the distance meters by adding mounting distances from the turning center of the erector turning portion to mounting positions of the distance meters that are previously acquired to the distance measurement values measured by the three or more distance meters, and correcting the positional deviation of the turning center of the erector turning portion resulting from eccentricity at every prescribed turning angle of the erector turning portion by calculating the average distance at every prescribed turning angle,
the segment roundness measuring method further comprising a step of acquiring roundness of the segment ring by converting a plurality of the average distances calculated at every prescribed turning angle to a plurality of X-Y coordinate values and correcting a center position of the segment ring on the basis of the plurality of X-Y coordinate values.

* * * * *